United States Patent [19]

Dahab et al.

[11] 4,123,136
[45] Oct. 31, 1978

[54] PIEZO-ELECTRIC LINE OF SIGHT CORRECTOR FOR INERTIAL PLATFORM STABILIZED SENSOR IN A STELLAR NAVIGATIONAL SYSTEM

[75] Inventors: Richard E. Dahab, New York, N.Y.; Howard M. Pollack, Fort Lee, N.J.

[73] Assignee: The Singer Company, Little Falls, N.J.

[21] Appl. No.: 752,496

[22] Filed: Dec. 20, 1976

[51] Int. Cl.² .......................................... G02B 23/00
[52] U.S. Cl. ................................. 350/16; 250/203 R; 310/332; 350/269; 350/289
[58] Field of Search ............... 350/16, 269, 270, 289, 350/DIG. 2; 250/203 R, 231 GY; 310/317, 331, 332

[56] References Cited

U.S. PATENT DOCUMENTS

| 3,146,367 | 8/1964 | McNaney | 350/269 X |
| 3,446,980 | 5/1969 | Meier | 350/16 X |
| 3,752,998 | 8/1973 | Stripling et al. | 250/231 GY X |

*Primary Examiner*—John K. Corbin
*Assistant Examiner*—Matthew W. Koren
*Attorney, Agent, or Firm*—Thomas W. Kennedy

[57] ABSTRACT

A line-of-sight corrector using piezo-electric crystals as actuators is provided for the inertial platform stabilized tracking telescope of an astro navigational system. The tracking telescope in the embodiment of the invention to be described herein includes a folded-type optical system, and the corrector is used to impart movement to the secondary mirror in the folded optical system to compensate for residual angular movements of the telescope which would otherwise perturb the image focused on the vidicon or solid state sensor in the telescope.

7 Claims, 2 Drawing Figures

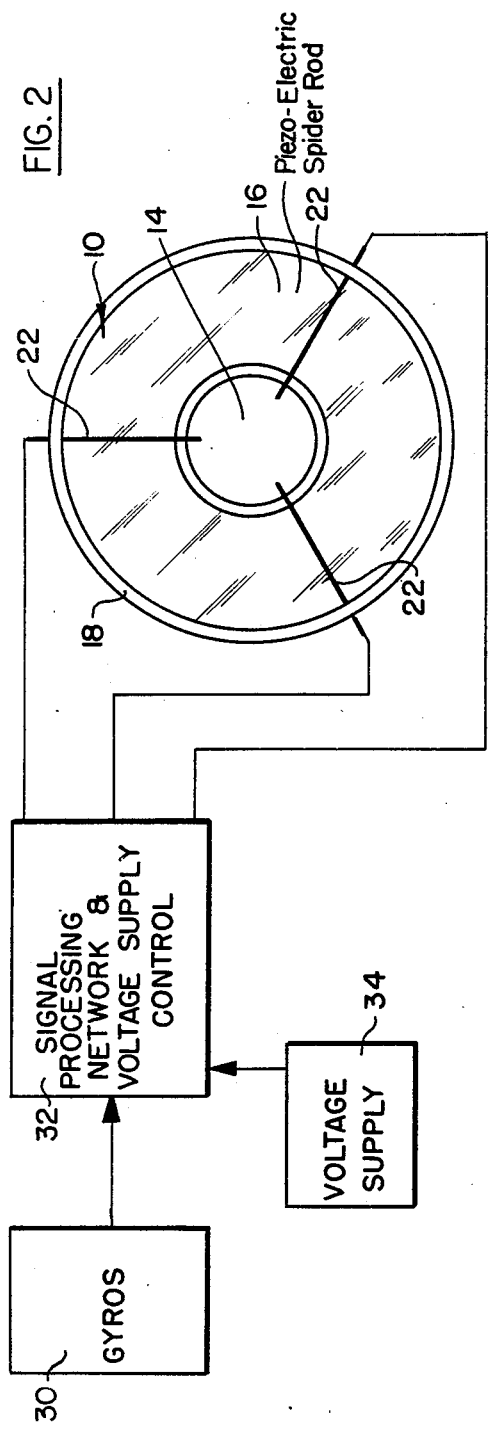
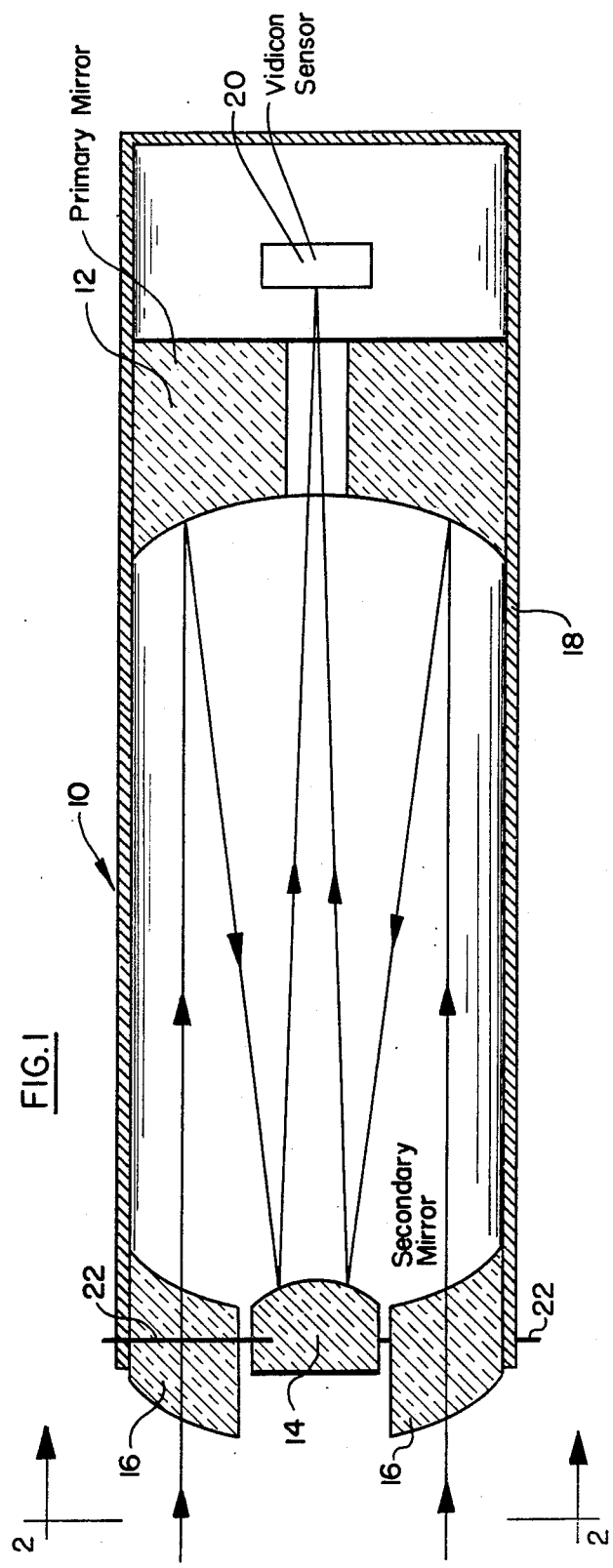

PIEZO-ELECTRIC LINE OF SIGHT CORRECTOR FOR INERTIAL PLATFORM STABILIZED SENSOR IN A STELLAR NAVIGATIONAL SYSTEM

The invention herein described was made in the course of or under a contract or sub-contract thereunder, with the Department of the Navy.

BACKGROUND OF THE INVENTION

The prior art astro navigation system incorporates an automatic astro tracker which computes the position of a selected celestial body relative to the vehicle in which the tracker is mounted, which searches out the body, which tracks the body automatically and accurately, and which determines the terrestrial position of the vehicle. The astro tracker includes a tracking telescope which during operation of the tracker is locked onto the celestial body. A vidicon or solid state stellar sensor is mounted in the tracking telescope, and an image of the celestial body is focused in the plane of the stellar sensor. By using a closed servo loop, the corrections from the tracker can be used to correct the values of input latitude and longitude, so that latitude and longitude counters can be up-dated as long as the tracking telescope is locked onto the selected celestial body.

The tracking telescope in most astro trackers is gyro stabilized, such stabilization being achieved by mounting the telescope on a stable platform in an inertial measuring unit. The inertial measuring unit is a self-contained system which can automatically maintain angular reference directions in inertial space. The inertial measuring unit includes a platform supported, for example, on three gimbals. The tracking telescope is mounted on the platform, as are, for example, three single-axis gyros designated the X-gyro, the Y-gyro and the Z-gyro. Any drift of the platform from the attitude prescribed by the gyros causes one or more of the gyros to generate signals, each of which is applied in a corresponding servo loop to a torquer motor which, in turn, applies a correction torque to the corresponding gimbal to return the platform to its stabilized position. Accelerometers are also mounted on the platform to measure the acceleration of the vehicle along each of the three coordinate axes.

One of the problems encountered in inertial platform stabilized astro tracker navigational systems arises due to friction in the platform gimbal bearings and in the torquer motors. In such navigational systems, as mentioned above, a high accuracy tracking telescope containing a vidicon or solid state sensor is mounted on the platform of a stabilized gimbal set in an inertial measuring unit, the telescope providing line-of-sight tracking between the sensor and a selected celestial body. Movements of the platform in such an inertial measuring unit cause the gyros to develop error signals. As also described above, these error signals are used in associated servo systems to energize torquer motors which introduce torques to the gimbals of the inertial platform system in directions to nullify such movements so that a constant attitude may be maintained.

However, the torquer motors and the gimbal bearings have inherent friction so that the error signals developed by the gyros are not completely reduced to zero in the servo loop at the lower frequencies, and a slight residual angular motion of the tracking telescope persists which blurs the stellar image focused on the sensor therein. Specifically, friction of the gimbal bearings and torquer motors causes uncorrected angular motion of the inertial measuring unit to induce residual oscillations in the gimbal set which cannot be compensated by the servo loops associated with the gyros. Thus, the level of stabilization of the tracking telescope is limited by the aforesaid friction so that unstabilized motion of low frequency is coupled to the telescope which creates perturberations in the line-of-sight and resulting blurring of the stellar image focused on the sensor.

The present invention provides a vernier system which senses the gyro pick-off signals, and which uses these signals to stabilize the line-of-sight through the telescope to the sensor. This stabilization is achieved by introducing the gyro pick-off signals to piezo-electric crystals, and using the resulting changes in the size of the crystals to provide compensation in the optical system of the telescope. In brief, piezo-electric crystals are used as actuating devices for optical elements of the tracking telescope in order to achieve the desired purposes of the invention.

Attempts have been made in the past to control the secondary mirror of the folded optical system in the tracking telescope by solenoids, or the like, to achieve stabilization of the image focused on the sensor. However, such solenoids generate magnetic fields which adversely affect the operation of the sensor. The piezo-electric crystal actuators of the present invention, on the other hand, use remote, low value electric fields which have no adverse effect on the sensor. In addition, none of the prior art devices have the advantage of low power requirements, in any way comparable with the actuators of the present invention.

Briefly stated, the present invention provides a piezo-electric line-of-sight corrector which serves to move the secondary mirror in a folded-type optical system, or a planar mirror in a direct-type optical system, of a tracking telescope in an astro navigational system to compensate for spurious angular perturberational effects in the line-of-sight of the telescope due to incomplete stabilization of the inertial measuring unit in which the telescope is installed. The corrector provides fine calibration or adjustment under static conditions, as well as corrections for misalignment under dynamic conditions.

In a particular embodiment of the invention to be described, piezo-electric actuators are used to position the secondary mirror of a folded-type optical system in an inertial measuring unit stabilized telescope in one or two degrees of freedom. The piezo-electric crystals are formed as spider rods supporting the secondary mirror. Voltages representing, for example, the residual error signals from the gyros of the inertial measuring unit are applied to the piezo-electric crystal rods, and the resulting length differentials in the rods serve to change the angular direction of the line-of-sight in the telescope in a manner to compensate for the perturberances of the sensor.

BRIEF DESCRIPTION OF THE DRAWINGS

FIG. 1 is a side section, showing in somewhat schematic form a folded-type optical system in the tracking telescope of an astro navigational system constructed in accordance with the concepts of the invention; and FIG. 2 is an end view of the telescope taken along the line 2—2 of FIG. 1, and FIG. 2 also shows various components in block form which form a control system

DETAILED DESCRIPTION OF THE ILLUSTRATED EMBODIMENT

The tracking telescope of FIGS. 1 and 2 is designated generally as 10. The telescope is mounted in usual manner on the inertial platform of an interial measuring unit, and it is normally directed at a selected celestial body. The particular telescope illustrated in FIGS. 1 and 2 incorporates a folded optical system which comprises a primary mirror 12, a secondary mirror 14, and a glass corrector plate 16, all mounted in a barrel 18. A vidicon or solid state sensor 20 is mounted in the barrel adjacent to a hole in the primary mirror.

In accordance with the invention, the secondary mirror 14 is supported by a plurality of piezo-electric crystal rods 22. As shown in FIG. 2, the pick-off signals from the gyros of the inertial measuring unit (represented by block 30) are processed in an appropriate conventional signal processing network 32 to produced appropriate voltages for application to the piezo-electric spider rods 22. The network 32 may be any known type of switching circuit which responds to residual error signals from the respective gyros to switch compensating voltages from a voltage supply 34 to the appropriate rods 22. The resulting movement of the secondary mirror provides a compensating angular movement of the line-of-sight through the telescope to maintain the image focused in the plane of sensor 20 at a stationary position.

As shown in FIGS. 1 and 2, the piezo-electric line-of-sight corrector of the invention is made up of three of four rods 22 of piezo-electric material which may be either imbedded in the corrector plate 16 (as shown), or which may be free-standing. These rods, in the illustrated embodiment comprise the spider for the secondary mirror 14. By translating the secondary mirror 14 in 2° of freedom in the hole in the center of the corrector plate 16, angular motion of the entire optical system can be compensated and the focused image will appear stationary on sensor 20.

The error signal voltages to drive the piezo-electric rods 22 may be derived from the gyros of the inertial measuring unit in an open loop system, such as shown in FIG. 2. As an alternative, the voltages may be derived from the rods themselves in a closed feedback loop for pressures exerted on the rods by decelerations of the instrument. In either case, voltages may be derived from the rods due to such pressures and may be fed back to the processing network 32 to damp out undesired oscillations or resonances in the system.

Although the piezo-electric actuator of the invention has been described herein in conjunction with a particular application, it is evident that its field of use is not so limited. The following claims are intended to cover all modifications which come within the true spirit and scope of the invention.

What is claimed is:

1. In combination:
    a folded optical system telescope including a secondary mirror;
    a plurality of elongated piezo-electric rod members forming a spider;
    a source of control voltage electrically coupled to the piezo-electric members for introducing a control voltage thereto to cause the elements to vary in size; and
    said secondary mirror mechanically coupled to and supported by said spider so that the position of said mirror may be controlled by said piezo-electric elements.

2. The combination defined in claim 1, and which includes an apertured primary mirror mounted in said telescope, and a sensor mounted in said telescope adjacent to the aperture in said primary mirror, so that the primary and secondary mirrors form an image of a remote light source on said sensor.

3. The combination defined in claim 2, and which includes gyro means electrically coupled to said control voltage source for controlling said spider in accordance with error signals developed by said gyro means to maintain the focused image stationary on said sensor.

4. In a telescope including a sensor, and an optical system having a primary mirror and a secondary mirror in a folded-type optical system for focusing an image of a remote light source on the sensor, a line-of-sight corrector comprising piezo-electric actuator means mechanically coupled to one of said mirrors, and means deriving an error signal representing perturbances of the sensor and for introducing said error signal to said piezo-electric actuator means to compensate for such perturbances.

5. The combination defined on claim 4, in which said piezo-electric actuator means comprises a spider composed of a plurality of radially-extending elongated piezo-electric rods, and said mirror is supported by said spider.

6. The combination defined in claim 5, in which said mirror comprises a secondary mirror in said folded-type optical system.

7. The combination defined in claim 4, in which said error signal driving means comprises at least one gyro.

* * * * *